United States Patent
Fan

(10) Patent No.: US 11,545,819 B2
(45) Date of Patent: Jan. 3, 2023

(54) WIRE MANAGEMENT BRACKET FOR WIRELESS CHARGER

(71) Applicant: Eagle Fan, Chu-Pei (TW)

(72) Inventor: Eagle Fan, Chu-Pei (TW)

( * ) Notice: Subject to any disclaimer, the term of this patent is extended or adjusted under 35 U.S.C. 154(b) by 45 days.

(21) Appl. No.: 17/335,745

(22) Filed: Jun. 1, 2021

(65) Prior Publication Data

US 2022/0385049 A1 Dec. 1, 2022

(51) Int. Cl.
*H02J 7/00* (2006.01)
*H02G 3/04* (2006.01)
*H02J 7/02* (2016.01)

(52) U.S. Cl.
CPC ......... *H02G 3/0456* (2013.01); *H02J 7/0042* (2013.01); *H02J 7/02* (2013.01)

(58) Field of Classification Search
None
See application file for complete search history.

(56) References Cited

U.S. PATENT DOCUMENTS

| 10,419,054 B1* | 9/2019 | VanTassell | H04M 1/04 |
| 2016/0043514 A1* | 2/2016 | George | H01R 35/025 439/501 |
| 2017/0321853 A1* | 11/2017 | Chien | H01R 33/00 |

* cited by examiner

*Primary Examiner* — Robert Grant
(74) *Attorney, Agent, or Firm* — Lin & Associates Intellectual Property, Inc.

(57) ABSTRACT

A wire management bracket for wireless charger is provided, including: a carrying seat, a wire management dial, and a ring seat; the carrying seat having an exposed accommodating groove located in central area, a groove wall of the accommodating groove having a notch; the wire management dial being disposed on the carrying seat and located at the other end surface where the accommodating groove located, the wire management dial being rotatable, having a neck on circumference, and a square groove at center; the ring seat being pivotally connected to the circumference of the carrying seat, and the angle between the ring seat and the carrying seat being adjustable, and when folded, the ring seat being tightly close to the carrying seat and allowing the wire management dial to be located in the central area of the ring seat.

14 Claims, 8 Drawing Sheets

WIRE MANAGEMENT BRACKET FOR WIRELESS CHARGER

BACKGROUND OF THE INVENTION

1. Field of the Invention

The present invention relates generally to a wire management structure for wireless charger, and more particularly, to a structure for both bracket can wire management.

2. The Prior Arts

Wireless charging for mobile phones is the latest trend. The mobile phone is directly placed on a wireless charging device, and the electromagnetic wave is induced to charge the mobile phone. Some mobile phones are equipped with highly functional wireless chargers. This type of wireless chargers has a strong magnetic force. When the wireless charger is near the phone, the wireless charger is automatically moved and attached to the phone to ensure that it is in the correct charging position and will not be easily detached by touching; thus, popular among consumers.

FIG. 1 is a perspective view of a wireless charger. The wireless charger 1 includes a charging module 11, a connector 12, and a wire 13. Both ends of the wire 13 are respectively connected to the charging module 11 and the connector 12, and the connector 12 is inserted into a power supply terminal or a mobile power source. The charging module 11 is provided with a magnet and a wireless charging circuit, which are responsible for attaching to the mobile phone and performing charging. However, the wireless charger 1 is usually placed in the bag, and the wire 13 is easily entangled with other items in the bag. Sometimes the wire may break or cause damage to other components. For this reason, it is desirable to devise a wire management bracket for the wireless charger.

SUMMARY OF THE INVENTION

A primary objective of the present invention is to provide a wire management bracket for wireless charger, which is used for wireless chargers to organize and storage, and also for using the magnetic attraction of the wireless charger to attach to the mobile phone so that the mobile phone can stand upright or tilt, to provide convenience to users for watching videos or other long-time use.

To achieve the aforementioned objective, the present invention provides a wire management bracket for wireless charger, including: a carrying seat, a wire management dial, and a ring seat; the carrying seat having an exposed accommodating groove located in central area, a groove wall of the accommodating groove having a notch; the wire management dial being disposed on the carrying seat and located at an opposite end surface where the accommodating groove is located, the wire management dial being rotatable, having a neck on circumference, and a square groove at center; the ring seat being pivotally connected to the circumference of the carrying seat, and the angle between the ring seat and the carrying seat being adjustable, and when folded, the ring seat being tightly close to the carrying seat and allowing the wire management dial to be located in the central area of the ring seat.

In a preferred embodiment, the wire management bracket can accommodate a wireless charger. The wireless charger includes a charging module, a connector, and a wire, and both ends of the wire are connected to the charging module and the connector respectively. When storing, the charging module is located in the accommodating groove, the wire extends through the notch and surrounds the neck, and the connector is located in the square groove.

In a preferred embodiment, the wire management dial further includes a channel connecting the square groove and the peripheral area of the neck.

In a preferred embodiment, a hole is provided at the center of the carrying seat, the hole is connected to the square groove, and the size and shape of the hole are smaller than the square groove.

In a preferred embodiment, the circumference of the carrying seat further includes a surrounding wall, and the surrounding wall is on the opposite end surface of the carrying seat relative to the accommodating groove, and the size of the surrounding wall corresponds to the ring seat, and when folded, the ring seat is tightly close to the surrounding wall.

In a preferred embodiment, the present invention further includes an accessory plate, the accessory plate is provided with a U-shaped stopper, and two opposite ends of the stopper are provided with an elastic clip; when the ring seat is placed on the accessory plate, and the ring seat is clamped by two elastic clips.

In a preferred embodiment, the circumference of the carrying seat further includes a surrounding wall, two opposite positions of the surrounding wall are disposed with an opening, and the positions of the two openings correspond to the positions of the elastic clip.

Compared with the prior art, the present invention has the following specific effects:
1. The wireless charger can be stored on the wire management bracket when not in use, therefore, easy to carry;
2. The wireless charger used in the wire management bracket can be magnetically attached to the mobile phone, which is convenient to support the mobile phone in an inclined or upright position, which is convenient for watching movies;
3. With the use of a carrying seat, the wire management bracket can be installed in various positions, which is convenient for holding the mobile phone.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

Figure 2:
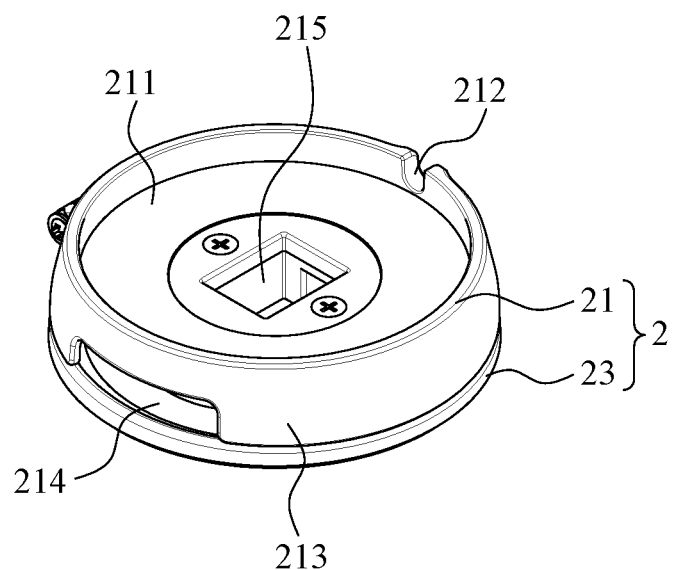
FIG. 2 is a perspective view of the wire management bracket for wireless charger of the present invention.
Figure 3A:
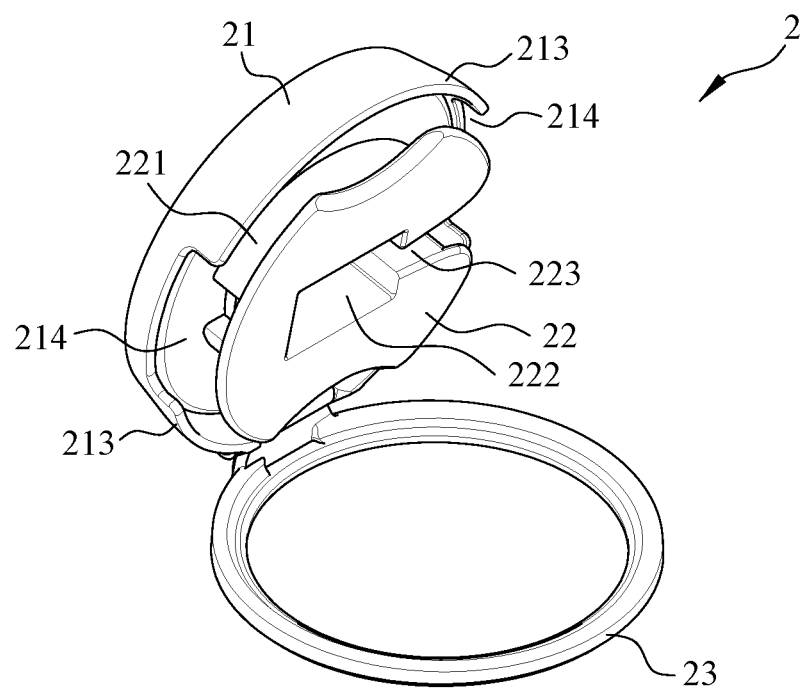
FIG. 3A is a schematic structural view of the wire management bracket for wireless charger of the present invention.
Figure 3B:
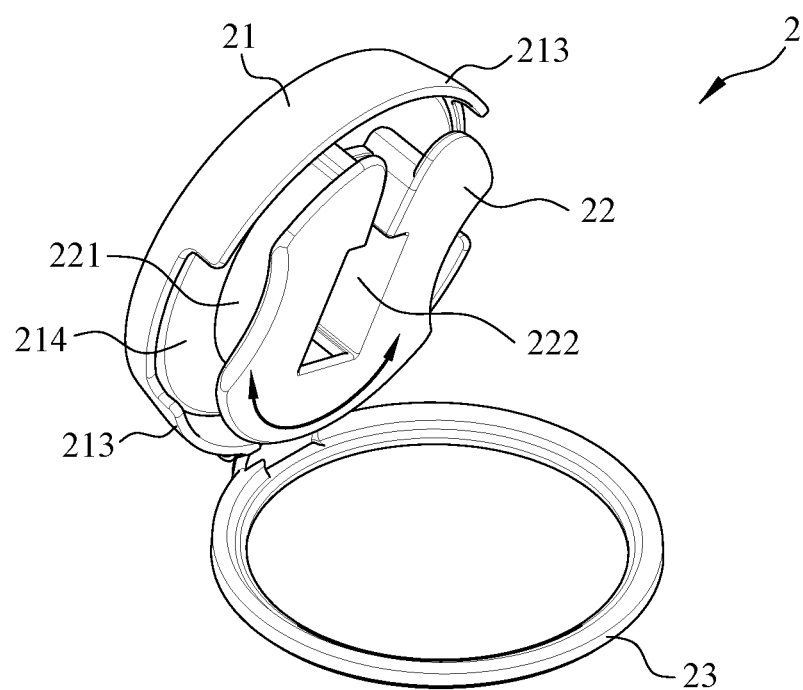
FIG. 3B is a schematic view of the wire management dial of the wire management bracket for wireless charger of the present invention when rotated.

FIG. 2, FIG. 3A and FIG. 3B show a schematic view and a structural view of the wire management bracket for wireless charger of the present invention. The wire management bracket 2 includes a carrying seat 21, a wire management dial 22, and a ring seat 23. The carrying seat 21 has an exposed accommodating groove 211, and the groove wall has a notch 212; the wire management dial 22 is mounted on the carrying seat 21 and is located at an opposite end surface where the accommodating groove 211 is located. The wire management dial 22 can be rotated. The wire management dial 22 has a neck 221 with a smaller outer diameter on the circumference and a square groove 222 in the center; the ring seat 23 is pivotally connected to the circumference of the carrying seat 21. After adjustment, the angle between the ring seat 23 and the carrying seat 21 can be changed for different purposes. After being folded, the ring seat 23 can be tightly close to the carrying seat 21 and allow the wire management dial 22 to be located in the central area of the ring seat 23 to form a flat shape for convenient storage and carrying.

Figure 1:
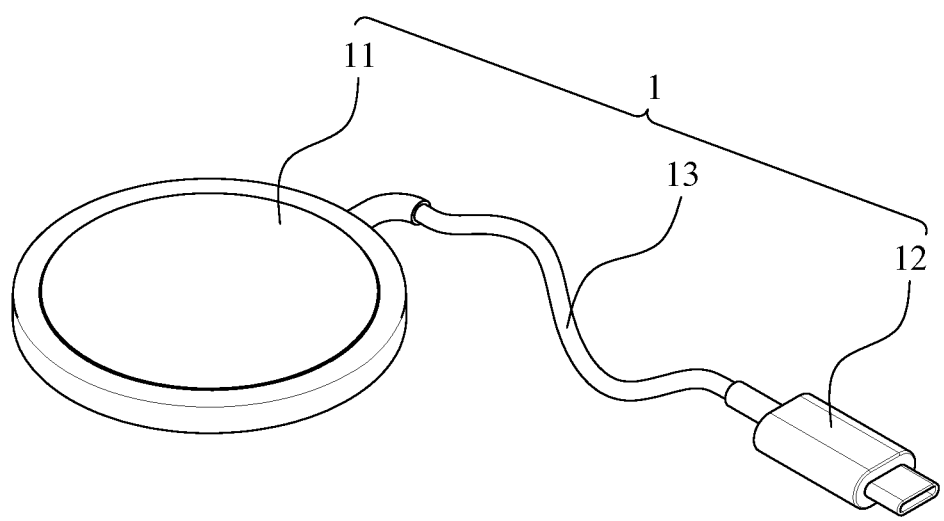
FIG. 1 is a perspective view of a wireless charger.

The wire management bracket 2 is used to organize and store a wireless charging device 1. As shown in FIG. 1, the wireless charger 1 includes a charging module 11, a connector 12, and a wire 13. The two ends of the wire 13 are respectively connected to the charging module 11 and the connector 12. In the present embodiment, the charging module 11 has a magnet in addition to related circuits and components for wireless charging, so that the charging module 11 can generate a magnetic attraction. For example, the charger for iIPhone12 produced by Apple Computer is of this type.

The following provides a detailed description of the structure of each component:

The carrying seat 21 has the accommodating groove 211 exposed and located in the central area, and the notch 212 is formed on the groove wall of the accommodating groove 211. The size of the accommodating groove 211 corresponds to the size of the charging module 11, so that the charging module 11 can be placed in the accommodating groove 211 during storage. The notch 212 is for the wire 13 to pass through. The other end surface of the carrying seat 21 opposite to the accommodating groove 211 is for the wire management dial 22 to be installed thereon. There is a surrounding wall 213 on the circumference, and the surrounding wall 213 has an opening 214 at two opposite positions. The opening 214 is used for other components, which will be described later.

As shown in FIG. 3A and FIG. 3B, the wire management dial 22 is installed on the carrying seat 21 and can rotate to accommodate the wires 13. The neck 221 is located in an area with a smaller outer diameter around the wire management dial 22. The square groove 222 is located in the central area of the wire management dial 22. A channel 223 connects the neck 221 and the square groove 222. The size of the square groove 222 corresponds to the connector 12 and is provided for placement, and the wire 13 can be wound around the neck 221 through the channel 223. In actual use, the connector 12 can be placed in the square groove 222 first, and then the wire management dial 22 is rotated so that the wires 13 are gradually wound around the neck 221 to achieve the purpose of accommodating the wire. There is a gap between the wire management dial 22 and the surrounding wall 213 to facilitate the passage of the wires 13 and the threading on the neck 221.

The ring seat 23 is pivotally connected to the circumference of the carrying seat 21, and the angle between the ring seat 23 and the carrying seat 21 is adjustable. The size of the ring seat 23 corresponds to the surrounding wall 213, and the inner diameter of the ring seat 23 corresponds to the wire management dial 22. When folded, the ring seat 23 can be tightly close to the surrounding wall 213, and the wire management dial 22 is positioned at the central area of the ring seat 23. In addition to preventing foreign objects from entering the neck 221, the ring seat 23 can also be used as a ring to assist the user in holding the mobile phone, or the ring seat 23 and the carrying seat 21 can be used to adjust the angle to form a bracket.

In addition, the center of the carrying seat 21 is also provided with a hole 215, the hole 215 is connected to the square groove 222, and the size and shape of the hole 215 are smaller than the square groove 222. The function of the hole 15 for the user to reach in with fingers to push out the connector 12 in the square groove 221, so that the connector 12 can be easily pulled out and inserted into a power supply terminal or a mobile power source.

Figure 4:
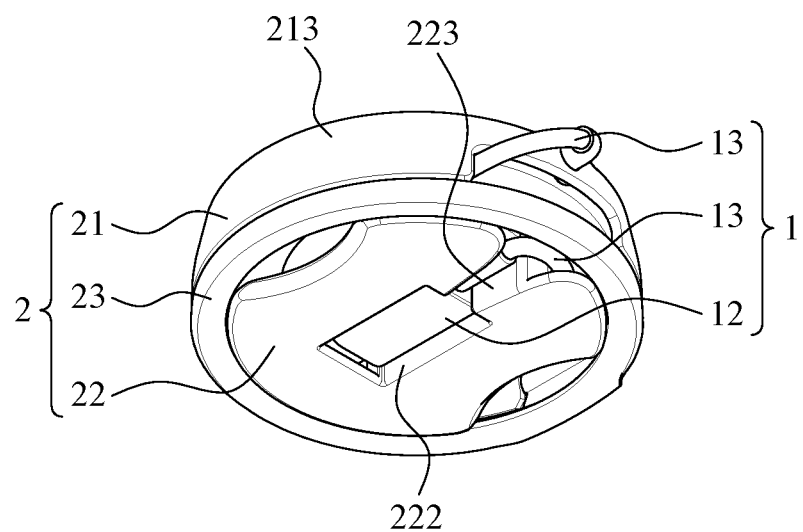
FIG. 4 is a three-dimensional view of the wire management bracket for wireless charger of the present invention when accommodating the wireless charger.
Figure 5:
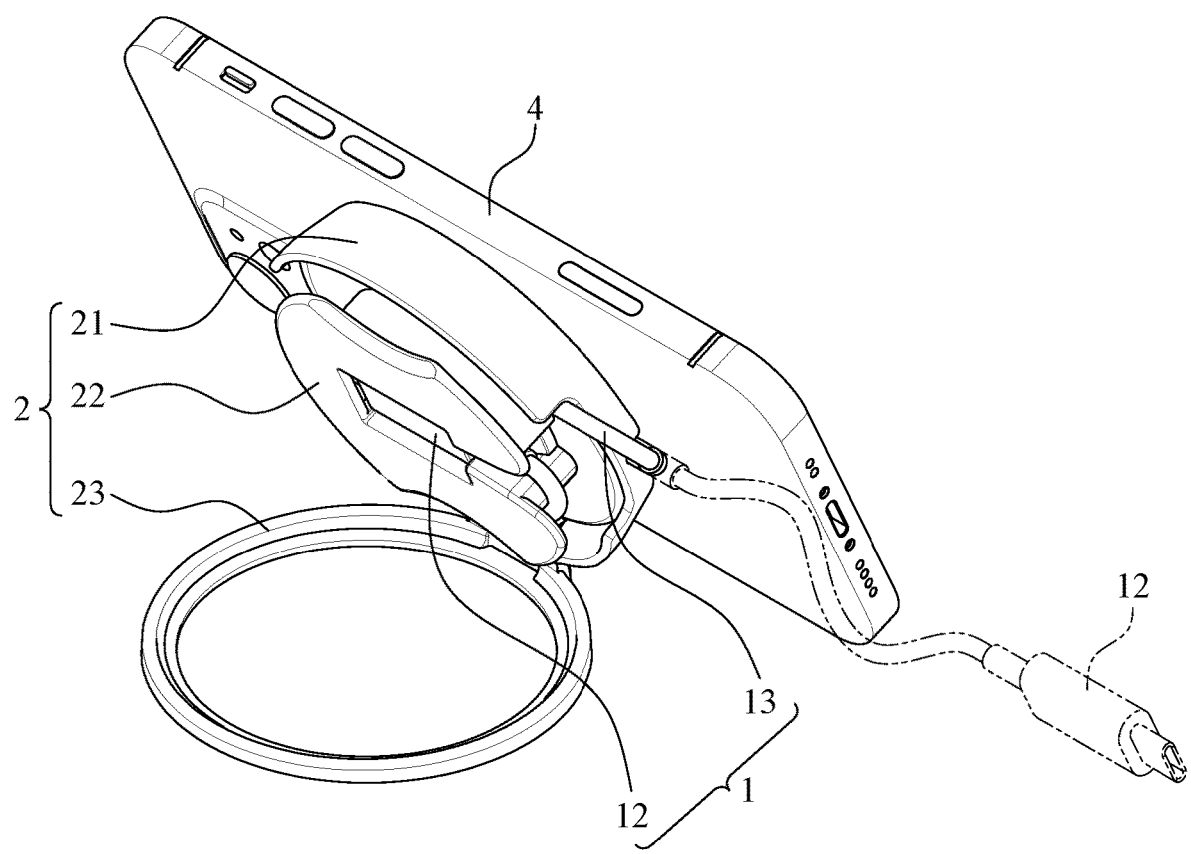
FIG. 5 is a view of the usage state of the wire management bracket for wireless charger of the present invention.

FIG. 4 is a perspective view of the wireless charger 1 stored in the wire management bracket 2. The charging module 11 of the wireless charger 1 is placed in the accommodating groove 211, the wire 13 passes through the notch 212, the other portion of the wire 13 is wound around the neck 221, and the connector 12 is placed in the square groove 222. The ring seat 23 abuts against the surrounding wall 213 to achieve the storage purpose. As shown in FIG. 5, another use state view for the present invention, if the mobile phone is to be tilted on the desktop, the ring seat 23 is adjusted to form an angle with the carrying seat 21, with the mobile phone 4 attached to the charging module 11, the present invention can support the phone in an inclined position. Of course, for charging at this point, the user can pull out the connector 12 and insert the connector 12 into the power supply terminal or the mobile power supply. In addition, the ring seat 23 can also be used as a ring for holding the mobile phone with multiple fingers.

Figure 6:
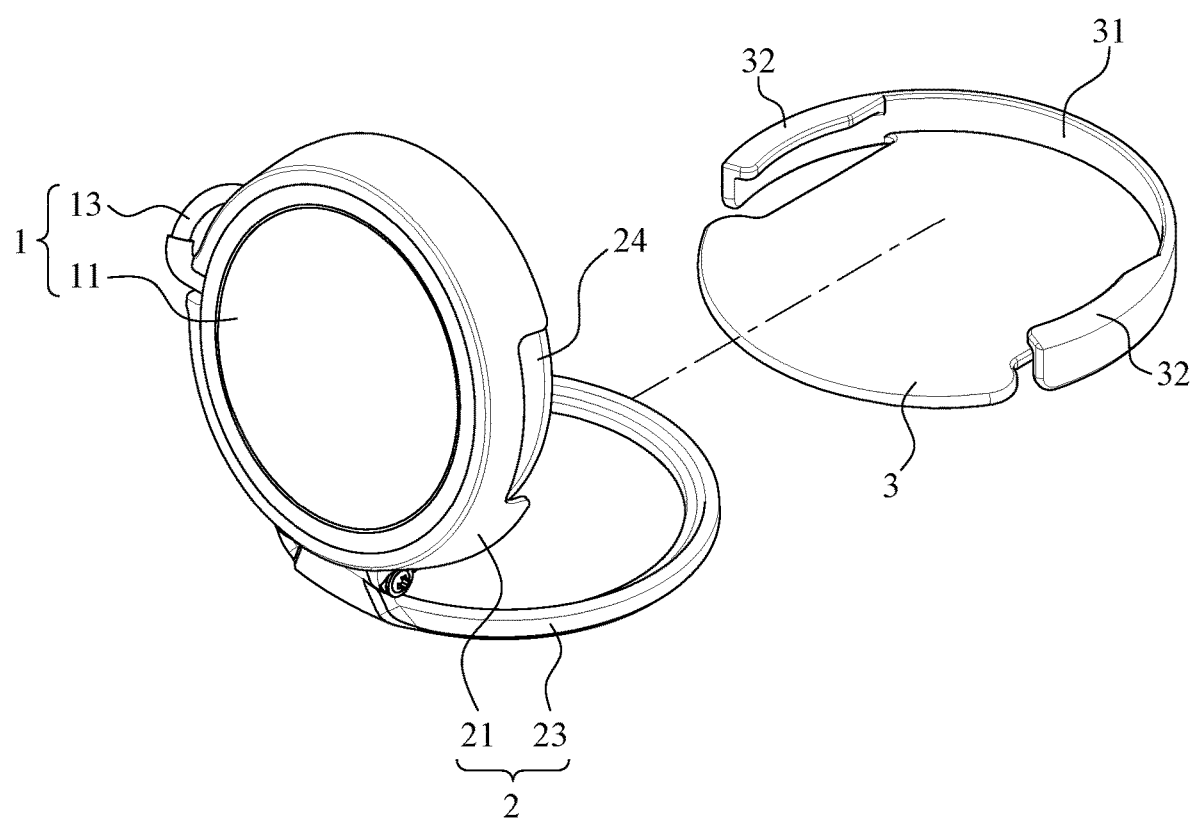
FIG. 6 is a view of another embodiment of the present invention.

As shown in FIG. 6, another embodiment of the present invention is shown. In the embodiment, an accessory plate 3 can also be used, and the accessory plate 3 can clamp or carry the ring seat 23, so that the wire management bracket 2 can be placed in different positions. The accessory plate 3 is a circular plate and is provided with a U-shaped protruding stopper 31. The two ends of the stopper 31 are provided with an elastic clip 32 located opposite to each other. The distance is just enough for the ring seat 23 to be inserted. When the ring seat 23 is placed on the accessory plate 3, the ring seat 23 is clamped by the two elastic clips 32. The positions of the other two openings 24 correspond to the elastic clip 32 to prevent the ring seat 23 from interfering with the elastic clip 32 when the ring seat 23 is attached to the carrying seat 21.

Figure 7:
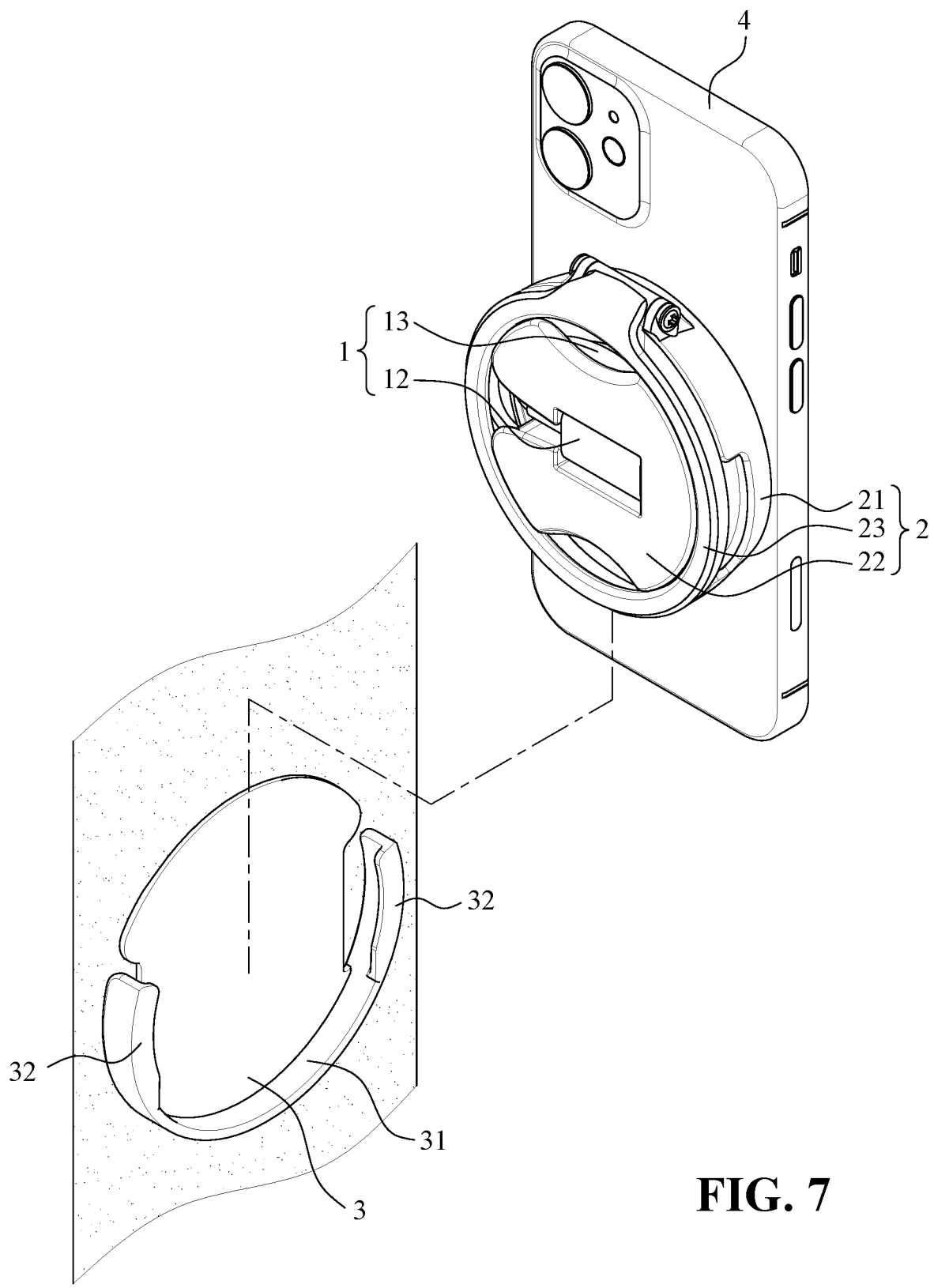
FIG. 7 is a view of the usage state of another embodiment of the present invention.

FIG. 7 is a view of the use state of the accessory plate 3 of the above embodiment. The carrying seat 21 is still attached to the mobile phone 4 by the charging module 11, and the accessory plate 3 can be attached to the wall or other surfaces as needed, so that the ring seat 23 is inserted between the two elastic clips 32. As such, the mobile phone 4 can be held on the wall, so that the user can watch the mobile phone or use for other purposes.

Based on the above, the wire management bracket 2 can accommodate the wireless charger 1 to shield the wires 13. In addition, the charging module 11 is used to magnetically attach to the mobile phone 4, and the ring seat 23 and the carrying seat 21 are adjusted for different angles to stand, which is more convenient to use, and meets the requirements of patent application.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A wire management bracket for wireless charger, comprising:
    a carrying seat, a wire management dial, and a ring seat; the carrying seat having an exposed accommodating groove located in a central area, a groove wall of the accommodating groove having a notch; the wire management dial being disposed on the carrying seat and located at an opposite end surface of the carrying seat where the accommodating groove is located, the wire management dial being rotatable, having a neck on circumference, and a square groove at center; the ring seat being pivotally connected to the circumference of the carrying seat, and an angle between the ring seat and the carrying seat being adjustable, and when the wire management bracket is folded, the ring seat being tightly close to the carrying seat and allowing the wire management dial to be located in a central area of the ring seat;
    wherein the wire management bracket is applicable for accommodating a wireless charger, the wireless charger comprises a charging module, a connector, and a wire, two ends of the wire are connected to the charging module and the connector respectively and when the wireless charger is stored, the charging module is located in the accommodating groove, the wire extends through the notch and surrounds the neck, and the connector is located in the square groove.

2. The wire management bracket for wireless charger according to claim 1, wherein the wire management dial further comprises a channel connecting the square groove and a peripheral area of the neck.

3. The wire management bracket for wireless charger according to claim 1, wherein a hole is provided at the center of the carrying seat, the hole is connected to the square groove, and the size and shape of the hole are smaller than the square groove.

4. The wire management bracket for wireless charger according to claim 1, wherein the circumference of the carrying seat further comprises a surrounding wall, and the surrounding wall is on the opposite end surface of the carrying seat relative to the accommodating groove, and the size of the surrounding wall corresponds to the ring seat, and when the wire management bracket is folded, the ring seat is tightly close to the surrounding wall.

5. The wire management bracket for wireless charger according to claim 1, further comprising an accessory plate, the accessory plate being provided with a U-shaped protruding stopper, and two opposite ends of the stopper being respectively provided with an elastic clip; wherein when the ring seat is placed on the accessory plate, the ring seat is clamped by two elastic clips.

6. The wire management bracket for wireless charger according to claim 5, wherein the circumference of the carrying seat further includes a surrounding wall, two opposite positions of the surrounding wall are respectively disposed with an opening, and the positions of the two openings correspond to the positions of the two elastic clips.

7. A wire management bracket for wireless charger, comprising: a carrying seat, a wire management dial, and a ring seat; the carrying seat having an exposed accommodating groove located in a central area, a groove wall of the accommodating groove having a notch; the wire management dial being disposed on the carrying seat and located at an opposite end surface of the carrying seat where the accommodating groove is located, the wire management dial being rotatable, having a neck on circumference, and a square groove at center; the ring seat being pivotally connected to the circumference of the carrying seat, and an angle between the ring seat and the carrying seat being adjustable, and when the wire management bracket is folded, the ring seat being tightly close to the carrying seat and allowing the wire management dial to be located in a central area of the ring seat; wherein the wire management dial further comprises a channel connecting the square groove and a peripheral area of the neck.

8. The wire management bracket for wireless charger according to claim 7, wherein a hole is provided at the center of the carrying seat, the hole is connected to the square groove, and the size and shape of the hole are smaller than the square groove.

9. The wire management bracket for wireless charger according to claim 7, wherein the circumference of the carrying seat further comprises a surrounding wall, and the surrounding wall is on the opposite end surface of the carrying seat relative to the accommodating groove, and the size of the surrounding wall corresponds to the ring seat, and when the wire management bracket is folded, the ring seat is tightly close to the surrounding wall.

10. The wire management bracket for wireless charger according to claim 7, further comprising an accessory plate, the accessory plate being provided with a U-shaped protruding stopper, and two opposite ends of the stopper being respectively provided with an elastic clip; wherein when the ring seat is placed on the accessory plate, the ring seat is clamped by two elastic clips.

11. The wire management bracket for wireless charger according to claim 10, wherein the circumference of the carrying seat further includes a surrounding wall, two opposite positions of the surrounding wall are respectively disposed with an opening, and the positions of the two openings correspond to the positions of the two elastic clips.

12. A wire management bracket for wireless charger, comprising: a carrying seat, a wire management dial, and a ring seat; the carrying seat having an exposed accommodating groove located in a central area, a groove wall of the accommodating groove having a notch; the wire management dial being disposed on the carrying seat and located at an opposite end surface of the carrying seat where the accommodating groove is located, the wire management dial being rotatable, having a neck on circumference, and a square groove at center; the ring seat being pivotally connected to circumference of the carrying seat, and an angle between the ring seat and the carrying seat being adjustable, and when the wire management bracket is folded, the ring seat being tightly close to the carrying seat and allowing the wire management dial to be located in a central area of the ring seat; wherein the circumference of the carrying seat further comprises a surrounding wall, and the surrounding wall is on the opposite end surface of the carrying seat relative to the accommodating groove, and the size of the surrounding wall corresponds to the ring seat, and when the wire management bracket is folded, the ring seat is tightly close to the surrounding wall.

13. The wire management bracket for wireless charger according to claim 12, further comprising an accessory plate, the accessory plate being provided with a U-shaped protruding stopper, and two opposite ends of the stopper being respectively provided with an elastic clip; wherein when the ring seat is placed on the accessory plate, the ring seat is clamped by two elastic clips.

14. The wire management bracket for wireless charger according to claim 13, wherein two opposite positions of the surrounding wall are respectively disposed with an opening, and the positions of the two openings correspond to the positions of the two elastic clips.

\* \* \* \* \*